US012749311B2

(12) United States Patent
Hościłowicz et al.

(10) Patent No.: US 12,749,311 B2
(45) Date of Patent: Sep. 29, 2026

(54) DISPLAY APPARATUS THAT PROVIDES ANSWER TO QUESTION BASED ON IMAGE AND CONTROLLING METHOD THEREOF

(71) Applicant: SAMSUNG ELECTRONICS CO., LTD., Suwon-si (KR)

(72) Inventors: Jakub Hościłowicz, Warsaw (PL); Adrian Wiśniewski, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 286 days.

(21) Appl. No.: 18/383,765

(22) Filed: Oct. 25, 2023

(65) Prior Publication Data

US 2024/0054785 A1 Feb. 15, 2024

Related U.S. Application Data

(63) Continuation of application No. PCT/KR2023/005966, filed on May 2, 2023.

(30) Foreign Application Priority Data

Jul. 21, 2022 (KR) ........................ 10-2022-0090605

(51) Int. Cl.

*G06V 20/40* (2022.01)
*G06F 40/284* (2020.01)
*G06F 40/40* (2020.01)

(52) U.S. Cl.

CPC ............ *G06V 20/46* (2022.01); *G06F 40/284* (2020.01); *G06F 40/40* (2020.01)

(58) Field of Classification Search

None

See application file for complete search history.

(56) References Cited

U.S. PATENT DOCUMENTS

| | | | | |
|---|---|---|---|---|
| 8,484,017 | B1 | 7/2013 | Sharifi et al. | |
| 9,286,910 | B1 | 3/2016 | Li et al. | |
| 9,965,705 | B2 | 5/2018 | Chen et al. | |
| 11,093,813 | B2 * | 8/2021 | Lao | G06N 3/006 |
| 11,328,713 | B1 * | 5/2022 | Lepird | G06F 40/295 |

(Continued)

FOREIGN PATENT DOCUMENTS

| | | | | |
|---|---|---|---|---|
| CN | 110704601 A | | 1/2020 | |
| CN | 110750630 A | * | 2/2020 | G06F 16/3329 |

(Continued)

OTHER PUBLICATIONS

WIPO Patentscope Machine English Translation of CN110750630 (Year: 2020).*

(Continued)

*Primary Examiner* — Michelle M Koeth

(74) *Attorney, Agent, or Firm* — Sughrue Mion, PLLC

(57) ABSTRACT

Disclosed is a display apparatus. The display apparatus includes a display; and one or more processors configured to, based on a user input being received while a video is provided through the display, obtain at least one passage by inputting information on the user input and the video to a first encoder, obtain a text by using a part of a plurality of tokens included in the at least one passage by inputting the video, the information on the user input, and the at least one passage into a neural network model, and output the obtained text.

20 Claims, 12 Drawing Sheets

(56) References Cited

U.S. PATENT DOCUMENTS

| | | | |
|---|---|---|---|
| 12,050,632 B2 | 7/2024 | Zhang et al. | |
| 2008/0209480 A1* | 8/2008 | Eide | H04N 21/47202 348/E7.071 |
| 2014/0074466 A1 | 3/2014 | Sharifi et al. | |
| 2017/0255693 A1 | 9/2017 | Trifunovic | |
| 2018/0267994 A1 | 9/2018 | Badr et al. | |
| 2019/0325224 A1 | 10/2019 | Lee | |
| 2020/0125967 A1 | 4/2020 | Seo et al. | |
| 2020/0175046 A1* | 6/2020 | Wang | G06N 3/09 |
| 2021/0248376 A1* | 8/2021 | Zhao | G06N 3/08 |
| 2021/0256055 A1 | 8/2021 | Trollope et al. | |
| 2022/0122357 A1 | 4/2022 | Zhao et al. | |
| 2022/0198149 A1* | 6/2022 | Wu | G06F 40/284 |
| 2022/0237892 A1* | 7/2022 | Anderton-Yang | G06V 10/764 |
| 2022/0350826 A1 | 11/2022 | Zhang et al. | |

FOREIGN PATENT DOCUMENTS

| | | |
|---|---|---|
| CN | 110990630 A | 4/2020 |
| CN | 108170816 B | 12/2020 |
| CN | 108920587 B | 9/2021 |
| CN | 114020891 A | 2/2022 |
| KR | 10-2019-0113712 A | 10/2019 |
| KR | 10-2059743 B1 | 12/2019 |
| KR | 10-2413960 B1 | 6/2020 |

OTHER PUBLICATIONS

Yueting Zhuang et al., "Multichannel Attention Refinement for Video Question Answering," ACM Trans. Multimedia Comput. Commun. Appl. 16, 1s, Article 24, Mar. 2020, Total 23 pages. https://doi.org/10.1145/3366710.

Chen Qu et al., "Passage Retrieval for Outside-Knowledge Visual Question Answering," SIGIR '21, Jul. 11-15, 2021, Virtual Event, Canada, Association for Computing Machinery, ACM ISBN 978-1-4503-8037, https://doi.org/10.1145/3404835.3462987, pp. 1753-1757.

Kennett Marino et al., "OK-VQA: A Visual Question Answering Benchmark Requiring External Knowledge," Jun. 2019, pp. 3195-3204.

"Modeling.py", Apr. 5, 2022, total 11pages, [https://github.com/jayleicn/ClipBERT/blob/main/src/modeling/modeling.py].

Danqi Chen et al., "Reading Wikipedia to Answer Open-Domain Questions," Proceedings of the 55th Annual Meeting of the Association for Computational Linguistics, pp. 1870-1879, Vancouver, Canada, Jul. 30-Aug. 4, 2017.

Madimir Karpukhin et al., "Dense Passage Retrieval for Open-Domain Question Answering," Facebook AI, University of Washington, Princeton University, arXiv:2004.04906v3 [cs.CL] Sep. 30, 2020, total 13 pages.

Junyeong Kim et al., "Modality Shifting Attention Network for Multi-modal Video Question Answering," Korea Advanced Institute of Science and Technology (KAIST), Samsung Research, arXiv:2007.02036v1 [cs.CV], Jul. 4, 2020, total 10 pages.

Devshree Patel et al., "Recent Advances in Video Question Answering: A Review of Datasets and Methods," School of Engineering and Applied Science, Ahmedabad University, India, arXiv:2101.05954v2 [cs.CV], Mar. 18, 2021, total 18 pages.

Noa Garcia et al., "KnowIT VQA: Answering Knowledge-Based Questions about Videos," Osaka University, CyberAgent, Inc., arXiv:1910.10706v3 [cs.CV], Dec. 24, 2019, total 10 pages.

Yu-Chieh Wu et al., "A Robust Passage Retrieval Algorithm for Video Question Answering," IEEE Transactions on Circuits and Systems for Video Technology, Oct. 2008, Total 14 pages.

Juan Luis Suarez-Diaz et al., "A Tutorial on Distance Metric Learning: Mathematical Foundations, Algorithms, Experimental Analysis, Prospects and Challenges (With Appendices on Mathematical Background and Detailed Algorithms Explanation)," DaSCI, Andalusian Research Institute in Data Science and Computational Intelligence University of Granada, arXiv:1812.05944v3 [cs.LG], Aug. 19, 2020, Total 82 pages.

Hu Xu et al., "VLM: Task-agnostic Video-Language Model Pre-training for Video Understanding," Facebook AI, Carnegie Mellon University, arXiv:2105.09996v3 [cs.CV], Sep. 30, 2021, Total 13 pages.

Jie Lei et al., "Less is More: CLIPBERT for Video-and-Language Learning via Sparse Sampling," UNC Chapel Hill, Microsoft Dynamics 365 AI Research, pp. 7331-7341, 2021.

Hu Xu et al., "VideoCLIP: Contrastive Pre-training for Zero-shot Video-Text Understanding," Facebook AI, Carnegie Mellon University, arXiv:2109.14084v2 [cs.CV], Oct. 1, 2021, Total 14 pages.

Hao Tan et al., "LXMERT: Learning Cross-Modality Encoder Representations from Transformers," arXiv:1908.07490v3 [cs.CL], Dec. 3, 2019, total 14 pages.

Liunian Harold Li et al., "Visualbert: A Simple and Performant Baseline for Vision and Language," Work in Progress, University of California, Los Angeles, Allen Institute for Artificial Intelligence, Peking University, arXiv:1908.03557v1 [cs.CV], Aug. 9, 2019, total 14 pages.

Alexey Dosovitskiy et al., "An Image is Worth 16×16 Words: Transformers for Image Recognition at Scale," Google Research, Brain Team, arXiv:2010.11929v1 [cs.CV], Oct. 22, 2020, total 21 pages.

Jingdong Wang et al., "Hashing for Similarity Search: A Survey," arXiv:1408.2927v1 [cs.DS], Aug. 13, 2014, total 29 pages.

Jeff Johnson et al., "Billion-scale similarity search with GPUs," Facebook AI Research, arXiv:1702.08734v1 [cs.CV], Feb. 28, 2017, total 12 pages.

Zhiguo Wang et al., "Multi-passage BERT: A Globally Normalized BERT Model for Open-domain Question Answering," AWS AI Labs, imarXiv:1908.08167v2 [cs.CL], Oct. 2, 2019, total 5 pages.

Ruiqi Guo et al., "Accelerating Large-Scale Inference with Anisotropic Vector Quantization," Proceedings of the 37th International Conference on MachineLearning, Online, PMLR 119, 2020, total 10 pages.

Yankai Lin et al., "Denoising Distantly Supervised Open-Domain Question Answering," Tsinghua University, Proceedings of the 56th Annual Meeting of the Association for Computational Linguistics (Long Papers), Melbourne, Australia, Jul. 15-20, 2018, pp. 1736-1745.

Wei Yang et al., "End-to-End Open-Domain Question Answering with BERTserini", arXiv:1902.01718v2 [cs.CL], Sep. 18, 2019, total 6 pages.

Antoine Miech et al., "HowTo100M: Learning a Text-Video Embedding by Watching Hundred Million Narrated Video Clips", Computer Vision Foundation, pp. 2630-2640, 2019.

Max Bain et al., "Frozen in Time: A Joint Video and Image Encoder for End-to-End Retrieval", University of Oxford, Univ Gustave Eiffel,, total 15 pages, 2021.

Ting Chen et al., "A Simple Framework for Contrastive Learning of Visual Representations", Proceedings of the 37 th International Conference on Machine Learning, Vienna, Austria, PMLR 119, 2020, total 11 pages.

Peng Wang et al., "FVQA: Fact-based Visual Question Answering", arXiv:1606.05433v4 [cs.CV], Aug. 8, 2017, total 16 pages.

Manas Gaur et al., "ISEEQ: Information Seeking Question Generation Using Dynamic Meta-Information Retrieval and Knowledge Graphs", The Thirty-Sixth AAAI Conference on Artificial Intelligence (AAAI-22), Jun. 28, 2022, total 11 pages.

Search Report dated Aug. 7, 2023, issued by World International Patent Organization in International Application No. PCT/KR2023/005966.

Written Opinion dated Aug. 7, 2023, issued by World International Patent Organization in International Application No. PCT/KR2023/005966.

Su et al., "End-to-End Video G06F16/783 Question-Answer Generation With G06F40/279 Generator-Pretester Network", IEEE Transactions on Circuits and Systems G06N3/08 for Video Technology, Jan. 13, 2021, pp. 4497-4507, vol. 31, XP011885320, doi:10.1109/TCSVT.2021.3051277.

(56) References Cited

OTHER PUBLICATIONS

Jiang et al., "LiVLR: A Lightweight Visual-Linguistic Reasoning Framework for Video Question Answering", Journal of Latex Class Files, Nov. 29, 2021, 11 pages, vol. 14, XP091105296, arXiv:2111.14547v1.

Garcia et al., "Knowledge-Based Visual Question Answering in Videos", ArXiv, Apr. 17, 2020, 3 total pages, XP093273892, arXiv:2004.08385v1, doi:10.48550/arXiv.2004.08385.

Wu et al., "Visual Question Answering: A Survey of Methods and Datasets", Computer Vision and Image Understanding, 2017, pp. 21-40, vol. 163, doi:10.1016/j.cviu.2017.05.001.

Communication dated May 15, 2025, issued by European Patent Office in European Patent Applicaiton No. 23843138.1.

* cited by examiner

DISPLAY APPARATUS THAT PROVIDES ANSWER TO QUESTION BASED ON IMAGE AND CONTROLLING METHOD THEREOF

This application is a by-pass continuation application of International Application No. PCT/KR2023/005966, filed on May 2, 2023, which is based on and claims priority to Korean Patent Application No. 10-2022-0090605, filed on Jul. 21, 2022, in the Korean Intellectual Property Office, the disclosures of which are incorporated by reference herein in their entireties.

BACKGROUND

Technical Field

This disclosure relates to a display apparatus and a controlling method thereof and, more specifically, to a display apparatus which receives a question based on an image and provides an answer corresponding to the question, and a controlling method thereof.

Background

Recently, a display apparatus that performs interactions with a user in various types has been developed and distributed.

For example, when a question is received from a user, a question & answer (QA) function for providing a search result for the question, that is, an answer to the question, is provided on a plurality of display devices.

Since a QA function provided in a display apparatus basically performs a search based only on a user input, excessively being dependent on a user input (for example, an utterance voice of a user), and when the user input is somewhat unclear, there is a problem that a search result corresponding to the user intention (a search result capable of solving the user's curiosity) may not be provided.

In a user's position, a user may feel some difficulty about to what extent the question should be specified, how to express the question, etc., and in a position of a display apparatus, it is difficult to grasp the intention of the question, and thus there is a problem in that a search result that has low relevance with the question of the user may be provided.

Therefore, there is a need for a display apparatus and a method for performing a search in consideration of an additional context or the like, in addition to a user input, and providing a user with a search result having high relevance to a question.

SUMMARY

A display apparatus according to an embodiment of the disclosure includes a display; and one or more processors configured to, based on a user input being received while a video is provided through the display, obtain at least one passage by inputting information on the user input and the video to a first encoder, obtain a text by using a part of a plurality of tokens included in the at least one passage by inputting the video, the information on the user input, and the at least one passage into a neural network model, and output the obtained text, and the first encoder may obtain a first feature vector corresponding to information on the user input and the video under the control of the one or more processors, obtain at least one second feature vector having a similarity equal to or greater than a threshold value with the first feature vector among a plurality of second feature vectors included in a preset dataset, and output the at least one passage corresponding to the at least one second feature vector, and the preset dataset includes the plurality of second feature vectors corresponding to each of the plurality of articles obtained by inputting the plurality of articles to a second encoder.

A method of controlling a display apparatus according to an embodiment of the disclosure includes providing a video; based on a user input being received while a video is provided, obtaining at least one passage by inputting information on the user input and the video to a first encoder; obtaining a text by using a part of a plurality of tokens included in the at least one passage by inputting the video, the information on the user input, and the at least one passage into a neural network model; and outputting the obtained text, and the first encoder may obtain a first feature vector corresponding to information on the user input and the video under the control of the one or more processors, obtain at least one second feature vector having a similarity equal to or greater than a threshold value with the first feature vector among a plurality of second feature vectors included in a preset dataset, and output the at least one passage corresponding to the at least one second feature vector, and the preset dataset may include the plurality of second feature vectors corresponding to each of the plurality of articles obtained by inputting the plurality of articles to a second encoder.

According to an embodiment of the disclosure, a computer readable recording medium including a program for executing a method of controlling a display apparatus includes providing a video; based on a user input being received while a video is provided, obtaining at least one passage by inputting information on the user input and the video to a first encoder; obtaining a text by using a part of a plurality of tokens included in the at least one passage by inputting the video, the information on the user input, and the at least one passage into a neural network model; and outputting the obtained text, and the first encoder may obtain a first feature vector corresponding to information on the user input and the video under the control of the one or more processors, obtain at least one second feature vector having a similarity equal to or greater than a threshold value with the first feature vector among a plurality of second feature vectors included in a preset dataset, and output the at least one passage corresponding to the at least one second feature vector, and the preset dataset may include the plurality of second feature vectors corresponding to each of the plurality of articles obtained by inputting the plurality of articles to a second encoder.

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

The terms such as "comprise" or "consist of" are used herein to designate a presence of a characteristic (e.g.: number, function, operation, element like component) and not to preclude a presence of additional characteristics.

The expression "At least one of A or/and B" should be understood to represent "A" or "B" or any one of "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

In this disclosure, terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

In the disclosure, a "user" may refer to a person using an electronic apparatus or an artificial intelligence electronic apparatus using an electronic apparatus (e.g., artificial intelligence electronic apparatus).

Hereinafter, one embodiment of the disclosure will be described in greater detail with reference to the accompanying drawings.

Figure 1:
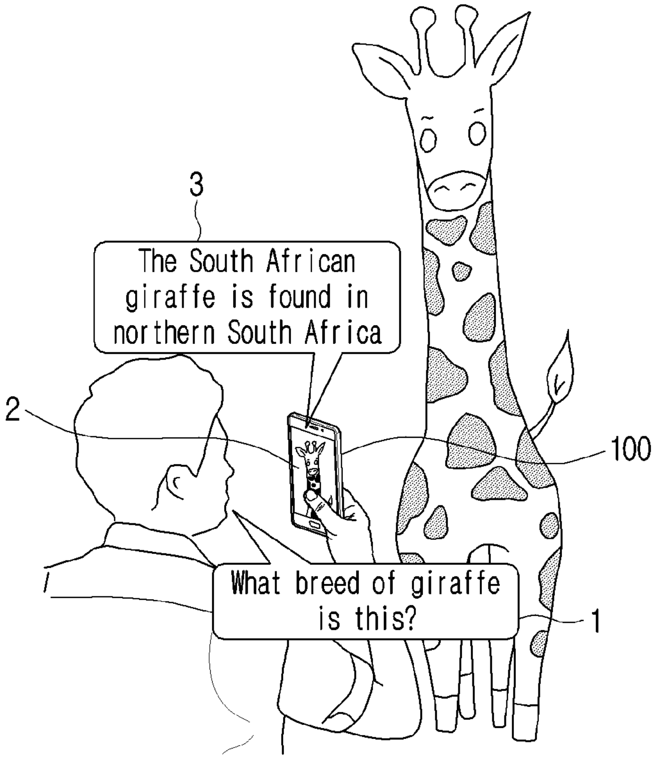
FIG. 1 is a diagram illustrating an operation of a display apparatus in overall according to an exemplary embodiment of the disclosure.

FIG. 1 is a diagram illustrating an operation of a display apparatus in overall according to an embodiment of the disclosure.

Referring to FIG. 1, a display apparatus 100 may display video data. Here, the video data may include a real-time video and a recorded video received from a camera (not shown).

The display apparatus 100 according to an embodiment of the disclosure may be implemented with a TV and is not limited thereto and may be applicable to a device having a display function like a video wall, a large format display (LFD), a digital signage, a digital information display (DID), a projector display, or the like. In addition, the display apparatus may be implemented with various types of displays such as a liquid crystal display (LCD), an organic light-emitting diode (OLED), a liquid crystal on silicon (LCoS), digital light processing (DLP), a quantum dot (QD) display panel, quantum dot light-emitting diodes (QLED), or the like.

For example, the display apparatus 100 may include, as illustrated in FIG. 1, a user terminal device (e.g., smartphone), and without limitation, may include a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a virtual reality (VR) device or a wearable device. Here, a wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implantable circuit. In some embodiments, the display apparatus 100 may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the display apparatus 100 may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

Meanwhile, a related-art display apparatus receives a user input and performs an operation corresponding to a user input. For example, if a user input is a uttered voice of a user, a related-art display apparatus performs a speech to text (STT) to obtain a text corresponding to the uttered voice, and if the text corresponds to a question, a search is performed based on a text (e.g., a query). The STT may be referred to as a speech to text algorithm.

In addition, the related-art display apparatus provides a search result as an answer corresponding to the question.

However, since a related-art display apparatus performs a search by using only a user input, a user has difficulty in how to configure a user input (for example, how a question should be configured or how a question should be formulated) in order to properly include information (for example, information matching the intention of a user) desired to know by a user into a search result, and it is difficult for a user to receive desired information as an answer.

The display apparatus 100 according to various embodiments of the disclosure performs a search by using a user input and a video, and thus, a user has an effect of reducing a worry and a burden on how to configure a user input in order to include information desired to know by a user in a search result. In addition, according to various embodiments of the disclosure, there is an advantage in that a user may easily receive desired information as an answer.

Particularly, if a feature that is difficult to formulate as a text is included in a video rather than a user input (for example, an uttered voice of a user), the display apparatus 100 performs a search by using the feature included in the video in addition to the user input, and thus a search result including information desired to know by a user may be provided as an answer.

Referring to FIG. 1, when a user input 1 is "What breed of giraffe is this?", a related-art display apparatus performs a search by using only the user input 1 (that is, "What breed of giraffe is this?"), so there is a limitation in that a search result for the breed of the giraffe may be provided as an answer without considering the features (for example, hair color, shape of spots of giraffe, etc.) of giraffe which a user is currently observing.

In contrast, the display apparatus 100 according to one embodiment of the disclosure performs a search using both the user input 1 and the video 2, and a search result 3 (e.g., "The South African giraffe is found in Northern South Africa.") based on the features (e.g., the hair color of the giraffe, the shape of the spots, etc.) of the giraffe included (or the user is currently observing) in the video 2 may be provided as an answer.

Providing a search which accepts video input and a text query and providing an answer responsive to the video and the text query is a groundbreaking achievement. This is not industry practice and is new. Previous approaches for providing answers to questions considered still images and are not able to process videos. Videos have more information than still images. For example a video may include information on a motion of the object. Motion is generally difficult to accurately recognize from a still image. Bringing together an external database with possibly millions of text entries into a common vector space with a particular video has not been done before and cannot be performed by a person. Accessing a database with millions of text industries requires a computer and bringing such a database together with a video and a question in a common vector space is an unusual achievement.

Figure 2:
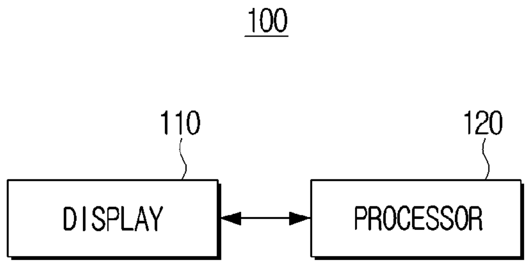
FIG. 2 is a block diagram illustrating a configuration of a display apparatus according to an exemplary embodiment of the disclosure.

FIG. 2 is a block diagram illustrating a configuration of a display apparatus according to an embodiment of the disclosure.

The display apparatus 100 according an embodiment of the disclosure includes a display 110 and one or more processors 120.

The display 110 according to an embodiment of the disclosure may be implemented as a display of various types such as, for example, and without limitation, a liquid crystal display (LCD), organic light emitting diodes (OLED) display, liquid crystal on silicon (LCoS), digital light processing (DLP), quantum dot (QD) display panel, quantum dot light emitting diodes (QLED), micro LED (μLED), mini LED, or the like.

One or more processors 120 according to an embodiment of the disclosure controls overall operations of the display apparatus 100.

The processor 120 according to an embodiment may be implemented with, for example, and without limitation, a digital signal processor (DSP) for image-processing of a digital image signal, a microprocessor, an AI processor, a time controller (TCON), or the like, but this is not limited thereto. The processor 120 may include, for example, and without limitation, one or more among a central processor (CPU), a micro controller unit (MCU), a microprocessor (MPU), a controller, an application processor (AP), a communication processor (CP), an advanced reduced instruction set computing (RISC) machine (ARM) processor, or may be defined as a corresponding term. The processor 120 may be implemented in a system on chip (SoC) type or a large scale integration (LSI) type which a processing algorithm is built therein, or in a field programmable gate array (FPGA) type.

In particular, the processor 120 according to an embodiment of the disclosure controls the display 110 to provide the video 2, and when the user input 1 is received while the video 2 is provided through the display 110, the processor 120 may obtain at least one passage by inputting information on the video 2 and the user input 1 to the first encoder.

Then, the video 2, the information on the user input 1, and the at least one passage are input to a neural network model to obtain text by using some of a plurality of tokens included in at least one passage.

Here, the video 2 input to the first encoder may include at least one frame image which is being provided through the display 110 at a time when the user input 1 is received.

However, this is merely an example, and the embodiment is not limited thereto. For example, the video 2 input to the first encoder may include a frame prior to a preset time from the time when the user input 1 is input to a frame after a preset time (that is, a plurality of frames of a predetermined time interval).

The text output by the neural network model may include an answer related to the user input 1 and the video 2 when the user input 1 is a question. Meanwhile, the processor 120 may control the display 110 to output a text, may control a speaker (not shown) to perform TTS on the text and output a sound corresponding to the text.

Hereinafter, a method by which one or more processors 120 acquire answers related to the user input 1 and the video 2 by using a plurality of encoders and a neural network model according to various embodiments of the disclosure will be described.

Figure 3:
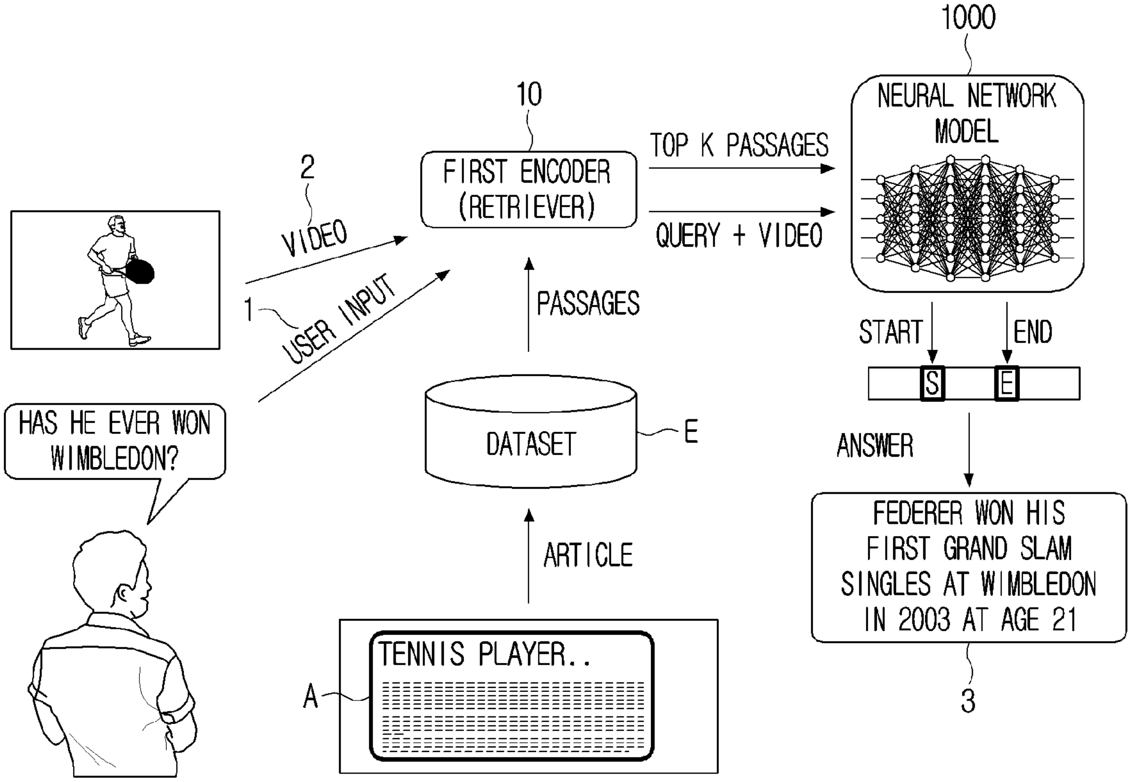
FIG. 3 is a diagram illustrating an operation of a display apparatus in overall according to an exemplary embodiment of the disclosure.

FIG. 3 is a diagram illustrating an operation of a display apparatus in overall according to an embodiment of the disclosure.

Referring to FIG. 3, while the video 2 is provided through the display 110, when the user input 1 (for example, user's uttered voice "Has he ever won Wimbledon?") is received, the processor 120 may recognize the uttered voice and may acquire a text corresponding to the uttered voice. For example, the processor 120 may perform automatic speech recognition (ASR), speech to text (STT), and the like to obtain a text corresponding to the uttered voice.

Then, the processor 120 may input information on the user input 1 (for example, a text corresponding to the uttered voice and the like) and the video 2 to the first encoder 10 to obtain at least one passage (for example, Top K Passages).

Here, the first encoder 10 may obtain the first feature vector corresponding to the user input 1 and the video 2 according to the control of the one or more processors 120.

Here, the first encoder 10 may be a neural network model that may use a video and a text as input data, trained to convert the input data into a vector value in a first vector space and output the first feature vector corresponding to the video and the text as output data.

Then, the first encoder 10 may obtain at least one second feature vector having a similarity greater than or equal to a threshold value with the first feature vector corresponding to the user input 1 and the video 2 among a plurality of second feature vectors included in a preset dataset (E). The first encoder 10 may then obtain at least one passage (e.g., Top K Passages) corresponding to the at least one second feature vector.

However, this is an example, and the first encoder 10 may arrange a plurality of second feature vectors included in a preset dataset (E) in the order of similarity with the first feature vector corresponding to the user input 1 and the video 2, and may obtain the first to Kth second feature vectors (i.e., Top K second feature vector) according to a similarity order among the plurality of second feature vectors. Subsequently, the first encoder 10 may output a passage corresponding to each of the K second feature vectors. That is, the first encoder 10 may obtain K passages (Top K passages) with high relevance to the user input 1 and the video 2.

In the meantime, the first encoder 10 obtains K passages (Top K passages) from the preset dataset and thus may be called a retrieve module, a retriever, or the like, but will be collectively referred to the first encoder 10 for convenience of description.

In the meantime, a preset dataset (E) may include a plurality of second feature vectors corresponding to each of a plurality of articles (A) obtained by inputting a plurality of articles (A) to the second encoder 20. A detailed description thereof will be described with reference to FIG. 6.

Then, the one or more processors 120 may obtain the text 3 included in the at least one passage or the text 3 by using some of the plurality of tokens included in the at least one passage by inputting the information about the user input 1, the video 2, and at least one passage (Top K passages) into the neural network model 1000. Here, the text 3 may be an answer to the question if the user input 1 is a question.

For example, referring to FIG. 3, the text 3 output by the neural network model 1000 is "Federer won his first grand slam singles at Wimbledon in 2003 at age 21 2003" and the corresponding text 3 may be an answer to the user input 1 (Has he ever won Wimbledon?).

The text 3 output by the neural network model 1000 may be a text included in at least one passage (Top K passages) as it is or a text generated by using some of a plurality of tokens included in at least one passage (Top K passages).

Figure 4:
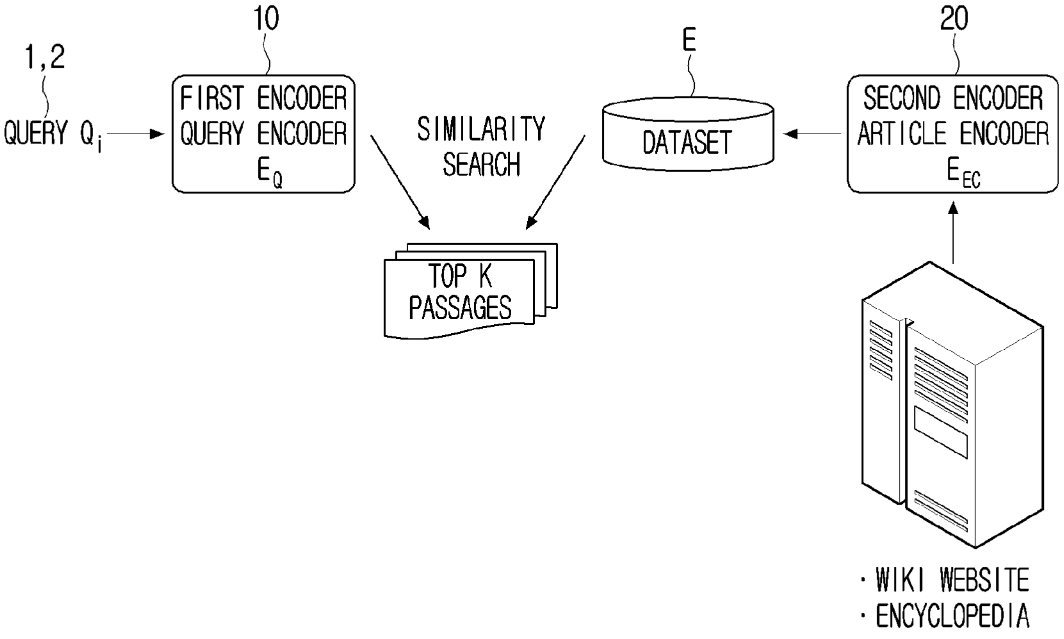
FIG. 4 is a diagram illustrating a first encoder and a second encoder according to an exemplary embodiment of the disclosure.

FIG. 4 is a diagram illustrating a first encoder and a second encoder according to an embodiment of the disclosure.

Referring to FIG. 4, the information on the user input 1 and the video 2 will be collectively referred to as a query ($Q_i$) for convenience of description.

The one or more processors 120 according to an embodiment inputs the query $Q_i$ to the first encoder 10 ($E_Q$).

In addition, the first encoder 10 may convert the query $Q_i$ to the first feature vector and may obtain at least one second feature vector having a similarity by a threshold or more with the first feature vector among a plurality of second feature vectors included in the preset dataset (E).

One or more processors 120 may obtain a plurality of passages by dividing each of a plurality of articles (e.g., Wiki type website, Wiki type encyclopedia, etc.) by a unit of a passage, and may obtain a plurality of second feature vectors by inputting each of a plurality of passages to the second encoder 20 (article encoder $E_{EC}$). The preset dataset E may include a plurality of second feature vectors.

The second encoder 20 may use a text as input data, and may be a neural network model trained to convert the input data to a vector value on the second vector space and output the second feature vector corresponding to the text as output data.

Figure 5:
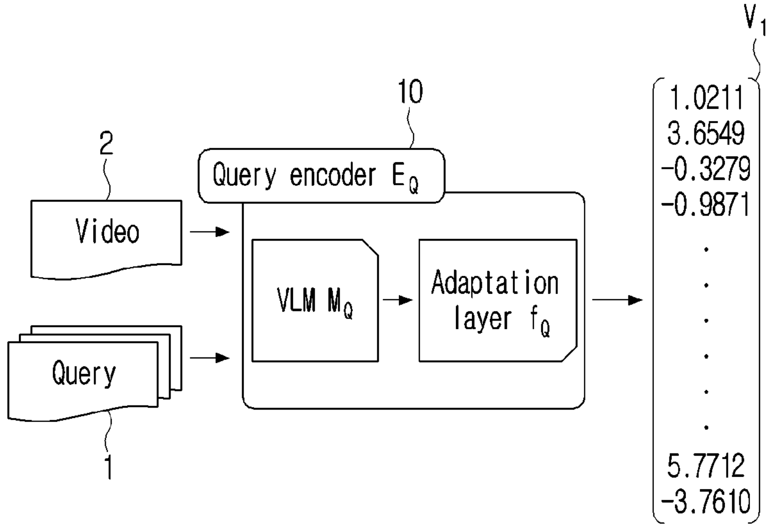
FIG. 5 is a diagram illustrating a first feature vector according to an exemplary embodiment of the disclosure.
Figure 6:
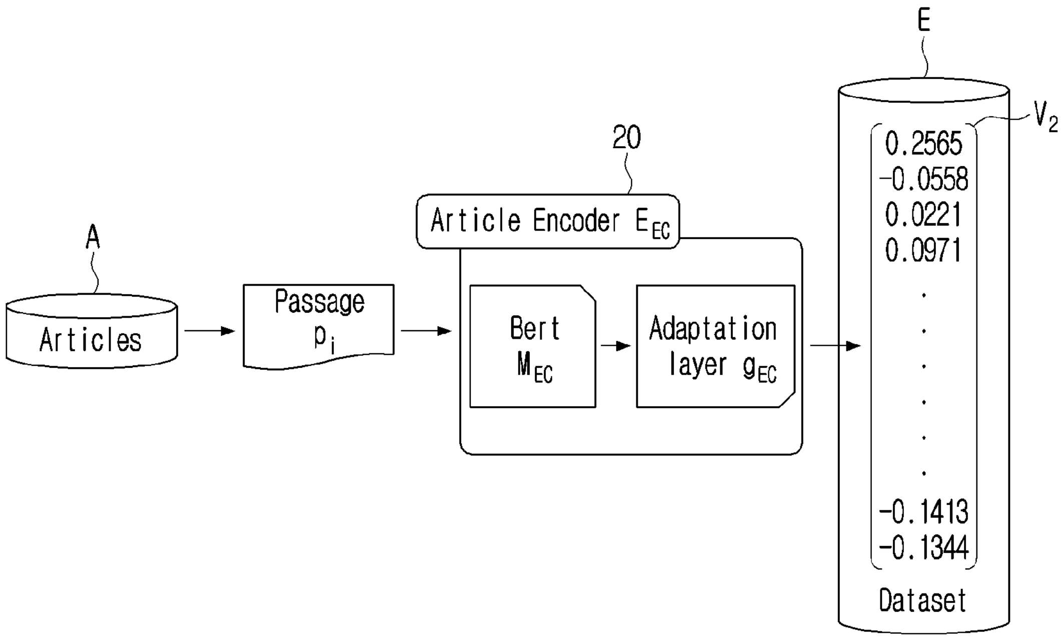
FIG. 6 is a diagram illustrating a second feature vector according to an exemplary embodiment of the disclosure.

A detailed description will be provided with reference to FIGS. 5 and 6.

FIG. 5 is a diagram illustrating a first feature vector according to an embodiment of the disclosure.

The first encoder 10 according to an embodiment of the disclosure may convert the query $Q_i$ to the first feature vector $V_i$ when the query $Q_i$ is input.

For example, the neural network model $M_Q$ included in the first encoder 10 may convert the query $Q_i$ to a vector value e on the d-dimensional space and may convert the adaptive layer $f_Q$ to the first feature vector $V_1$. $M_Q$ represents a Video Language Model, and may be referred to as VLM $M_Q$.

Here, the neural network model ($M_Q$) may be CLIPBERT model and the vector value e output by the neural network model $M_Q$ may be located on the $R^S$ vector space ($e \in R^s$). In the meantime, the neural network model $M_Q$ may include various types of neural network models that convert a video and a text to a vector value on a vector space, in addition to CLIPBERT.

FIG. 6 is a diagram illustrating a second feature vector according to an embodiment of the disclosure.

The one or more processor 120 according to an embodiment of the disclosure may obtain a plurality of passages $P_i$ by dividing the article A in a unit of a passage. Then, the processor 120 may input a plurality of passages $P_i$ to the second encoder 20.

According to an embodiment, when a plurality of passages $P_i$ are input, the second encoder 20 may convert a plurality of passages $P_i$ to the second feature vector $V_2$.

For example, the neural network model ($M_{EC}$) included in the second encoder may convert each of a plurality of passages $P_i$ to the vector value 1 on the d-dimensional space and then the adaptive layer $g_{EC}$ may convert the vector value 1 to the second feature vector $V_2$.

Here, a neural network model ($M_{EC}$) may be a BERT model, and a vector value (1) output by a neural network model ($M_{EC}$) may be located on an $R^m$ vector space ($1 \in R^m$). Meanwhile, the neural network model ($M_{EC}$) may include various types of neural network models for converting texts into vector values in a vector space, in addition to the BERT.

The preset dataset (E) according to an embodiment of the disclosure may be obtained through a process as shown below.

First, the one or more processors 120 may obtain a plurality of articles (e.g., Wiki type website, Wiki type Encyclopedia, etc.). For example, the processor 120 may obtain A articles (e.g., several tens of thousands of articles, several million articles, etc.) ($a_1$, $a_2$, $a_A$).

One or more processors 120 may separate each of a plurality of articles ($a_1$, $a_2$, . . . , $a_A$ in a unit of a passage having the equal length.

For example, the processor 120 may separate a $j^{th}$ article ($a_j$) into m passages which will be formulated as below.

$$C^{(aj)}=\{p_1^{(aj)}, p_2^{(aj)}, \ldots, p_i^{(aj)}, \ldots, p_M^{(aj)}\}$$

Here, $C^{(aj)}$ means a set of M passages included in the $j^{th}$ article ($a_j$), and $p_i^{(aj)}$ may mean an $i^{th}$ passage among a plurality of passages included in the $j^{th}$ article ($a_j$).

The processor 120 may divide each of a plurality of articles ($a_1$, $a_2$, . . . , $a_A$) in a unit of a passage, and may obtain database as shown below.

$$E=\{C^{(a1)}, C^{(a2)}, C^{a3)}, \ldots, C^{(aA)}\}$$

Here, E may mean a set of passages ($C^{(aA)}$) included in a set ($C^{a1)}$) of a passage included in article 1 ($a_1$) to a set ($C^{(aA)}$) of passages included in article A ($a_A$). That is, E may include a plurality of passages ($P_i$) corresponding to each of a plurality of articles ($a_1$, $a_2$, $a_A$).

Then, the processor 120 may input a plurality of passages ($P_i$) corresponding to each of a plurality of articles ($a_1$, $a_2$, . . . , $a_A$) to the second encoder 20, and the second encoder 20 may obtain a second feature vector $V_2$ corresponding to each of the plurality of passages.

Here, the preset dataset (E) may include a plurality of second feature vectors $V_2$.

Figure 7:
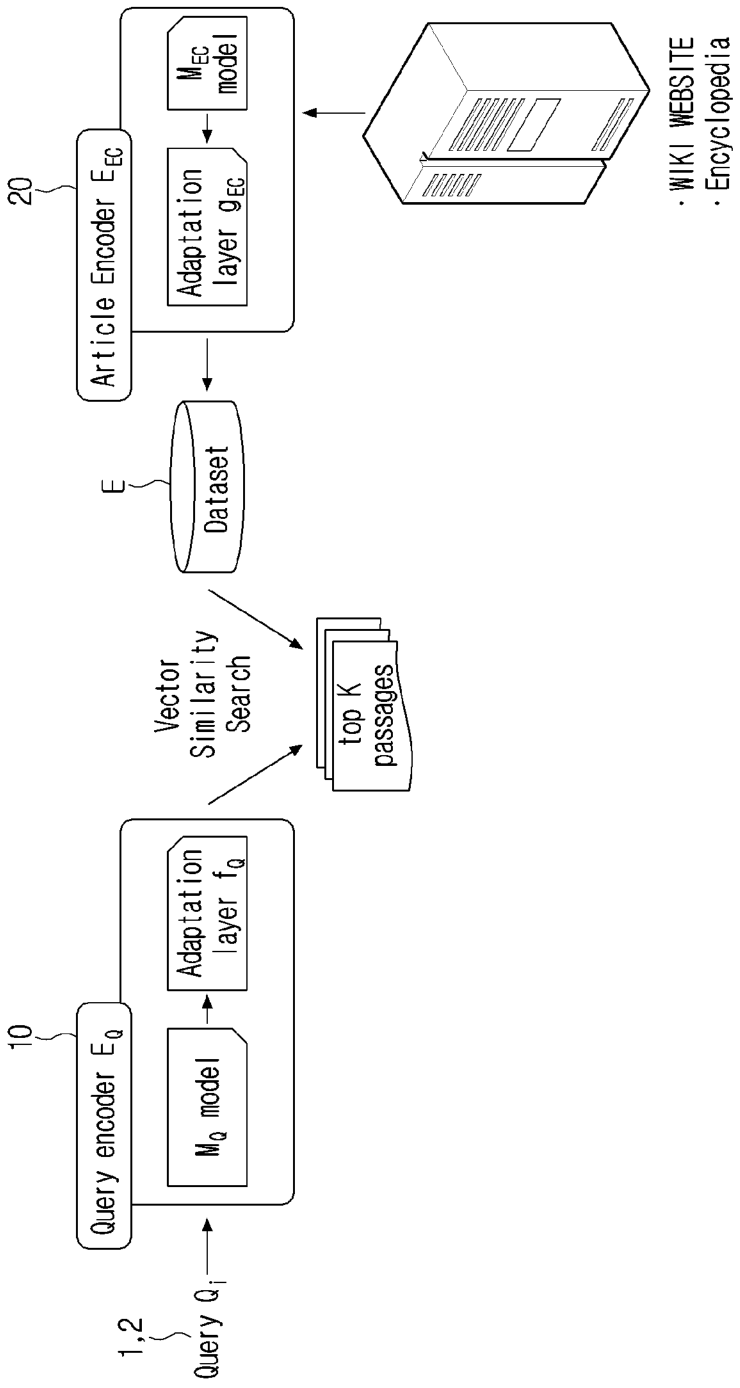
FIG. 7 is a diagram specifically illustrating a first encoder and a second encoder according to an exemplary embodiment of the disclosure.

FIG. 7 is a diagram specifically illustrating a first encoder and a second encoder according to an embodiment of the disclosure.

The first encoder 10 according to an embodiment of the disclosure may obtain a first feature vector $V_1$ corresponding to a query $Q_i$ when the query $Q_i$ is input, and may obtain K passages (Top K Passages) having a similarity equal to or greater than a threshold value with the first feature vector $V_1$ among a plurality of second feature vectors $V_2$ included in a preset dataset.

For example, the first encoder 10 may identify similarity between the first feature vector $V_1$ and a plurality of second feature vectors $V_2$ based on Equation 1 below.

$$\mathrm{Sim}(Q_i, <P_M^{(aj)}>)=E_Q(Q_i)^T E_{EC}(<P_M^{(aj}>)$$

Here, $Q_i$ may mean a query, $<P_M^{(aj)}>$ may mean $M^{th}$ passage of the $j^{th}$ article, $E_Q(Q_i)$ may mean the first feature vector corresponding to $Q_i$, $E_{EC}(<P_M^{(aj)}>)$ may mean the second feature vector corresponding to $<P_M^{(aj)}>$, and Sim may mean a similarity function.

For example, Sim may be a function formulating a distance between the first feature vector $V_1$ and the second feature vector $V_2$ on a vector space as a value of 0 to 1. However, this is merely an example, and the processor 120 may use various similarity identification functions and similarity identification algorithms.

The first encoder 10 according to an embodiment of the disclosure identifies a similarity for each of the first feature vector $V_1$ and a plurality of second feature vectors $V_2$, and may obtain the second feature vector $V_2$ from the first to $K^{th}$ second feature vector $V_2$ according to a similarity order among a plurality of second feature vectors $V_2$. Subsequently, the first encoder 10 may obtain a passage (Top K passages) corresponding to each of the K second feature vectors.

In the meantime, in order to identify similarity between the first feature vector $V_1$ and the second feature vector $V_2$, it seems necessary that a vector space in which the first feature vector $V_1$ is located and a vector space in which the second feature vector $V_2$ is located may be the same vector space (or same dimensionality).

Referring to FIG. 7, a neural network model $M_Q$ included in the first encoder 10 may convert a query $Q_i$ into a vector value (V) on a d-dimensional space, and the vector value (V) may be located on the $R^{dv}$ vector space ($V \in R^{dv}$).

Then, the adaptive layer ($f_Q$) may convert the $R^{dv}$ vector space to the $R^d$ vector space ($f_Q$: $R^{dv}$->$R^d$). Accordingly, the first encoder 10 may convert the query $Q_i$ into the first feature vector $V_i$ located on the $R^d$ vector space.

$$E_Q=f_Q(M_Q(Q_i)) \in R_d \qquad \text{[Equation 2]}$$

Here, $f_Q=W^Q{}_V+b^Q$, $W^Q \in R^{dv \times d}$, $b^Q \in R^d$.

In addition, a neural network model ($M_{EC}$) included in the second encoder 20 may convert each of a plurality of passages ($P_i$) into a vector value (c) on the d-dimensional space, and the vector value (c) may be located on the $R^{dc}$ vector space ($c \in R^{dc}$).

The adaptive layer ($g_{EC}$) may convert the $R^{dc}$ vector space to the $R^d$ vector space ($g_{EC}$: $R^{dc}$->$R^d$). Accordingly, the second encoder 20 may convert each of a plurality of passages ($P_i$) into the second feature vector $V_2$ located on the $R^d$ vector space.

$$E_{EC} g_{EC}(<P_M^{(aj)}>)) \in R^d \qquad \text{[Equation 3]}$$

Here, $g_{EC}=W^{EC}c+b^{EC}$, $W^{EC} \in R^{dc \times d}$, $b^{EC} \in R^d$.

In the meantime, since the vector space in which the first feature vector $V_1$ is located is the same as the vector space in which the second feature vector $V_2$ is located, the first encoder 10 may identify the similarity between the first feature vector $V_1$ and the plurality of second feature vectors $V_2$.

The first encoder 10 according to an embodiment of the disclosure may obtain K passages (Top K passages) having a similarity greater than or equal to a threshold value by using a FAISS algorithm, which is an example of a neighbors search algorithm ($p_i^{(aj)}$, . . . , $p_{i+k}^{(aj)}$).

In the meantime, a learning process of the first encoder 10 is described. Specifically, an algorithm (for example, neighbors search algorithm) used to determine similarity by the first encoder 10 may include the first feature vector corresponding to a video and a text, a first sample passage related to a video and a text, and a plurality of second sample passages not related to the video and text as learning data.

In addition, the algorithm used to determine similarity by the first encoder 10 has a similarity equal to or greater than a threshold value between the first feature vector and the second feature vector corresponding to the first sample passage, and may learn to have a similarity less than a threshold value between the first feature vector and a second feature vector corresponding to each of the plurality of second sample passages. For example, the learning data R is as shown below.

$$R=\{<Q_c, (p^+{}_c), (p^-{}_{c,1}), (p^-{}_{c,2}), \ldots, (p^-{}_{c,n})>\}^m{}_{c=1}$$

Here, $Q_c$ denotes a $C^{th}$ query, $p^+{}_c$ denotes a sample passage (first sample passage) related to a $C^{th}$ query, $p^+{}_c$ denotes an $i^{th}$ sample passage among a plurality of sample passages (second sample passages) not associated with a $c^{th}$ query, and m denotes the number of learning data.

The processor 120 according to an embodiment of the disclosure may train a similarity identification algorithm in a direction of optimizing a loss function such as Equation 4 below.

$$L(<Q_c, (p_c^+), (p_{c,1}^-), \ldots, (p_{c,n}^-)>) = -\log \frac{e^{sim(Q_C,(p_C^+))}}{e^{sim(Q_C,(p_C^+))} + \sum_{j=1}^{n} e^{sim(Q_C,(p_C^-))}} \quad \text{[Equation 4]}$$

The processor 120 may input K passages (Top K Passages) ($p_i^{(aj)}, \ldots, p_{i+k}^{(ai)}$), the user input 1 and the video 2 to the neural network model 1000. Meanwhile, in an example of K passage (Top K Passages) ($p_i^{(aj)}, \ldots, p_{i+k}^{(aj)}$), as illustrated in FIG. 3, if the information on the user input 1 is "Has he ever won Wimbledon?" and the video 2 is a tennis match including a male player, the processor 120 may obtain K passages (Top K passages) ($p_i^{(aj)}, \ldots, p_{i+k}^{(aj)}$) included in each of a list of tennis players (article 1), a list of The Wimbledon Championships winner (article 2), and a list of grand slam winners (article 3) from a plurality of articles.

Figure 8:
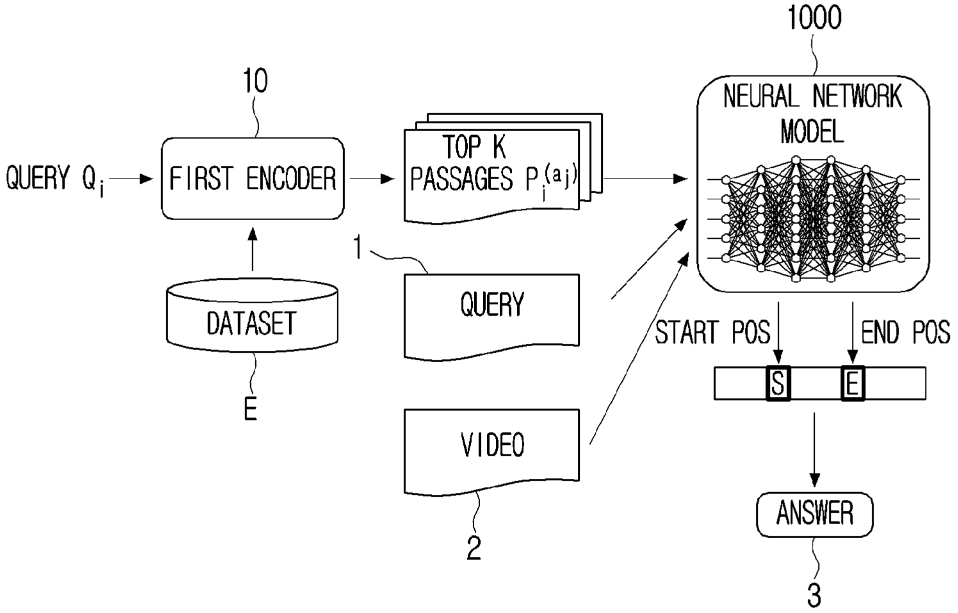
FIG. 8 is a diagram illustrating a neural network model according to an exemplary embodiment of the disclosure.

FIG. 8 is a diagram illustrating a neural network model according to an embodiment of the disclosure.

The neural network model 1000 according to an embodiment of the disclosure may receive, under the control of the processor 120, K passages (Top K passages) ($p_i^{(aj)}, \ldots, p_{i+k}^{(aj)}$) as input data from the first encoder 10.

In addition, the neural network model 1000 may receive the query $Q_i$, that is, the information about the user input 1 and the video 2 as input data.

The neural network model 1000 may obtain a text (hereinafter, answer 3, see for example, FIG. 1) based on the information about the user input 1, the video 2, and K passages (Top K passages) ($p_i^{(aj)}, \ldots, p_{i+k}^{(aj)}$).

To be specific, the neural network model 1000 may obtain a plurality of tokens through tokenization of each of the user input 1 (hereinafter, question) and K passages (Top K passages) ($p_i^{(aj)}, \ldots, p_{i+k}^{(aj)}$).

For example, the neural network model 1000 may separate each of the user input 1 (hereinafter, question) and K passages (Top K passages) ($p_i^{(aj)}, \ldots, p_{i+k}^{(aj)}$) in units of words. For example, an $i^{th}$ passage ($p_i^{(aj)}$) of a $j^{th}$ article may include n tokens ($p_i^{(aj)}=\{w_1^{(i)}, w_2^{(i)}, \ldots, w_n^{(i)}\}$).

The neural network model 1000 according to an embodiment may obtain the answer 3 based on the video 2 and a plurality of tokens.

In one example, the neural network model 1000 may identify an answer span of the question 1 and the answer 3 corresponding to the video 2 (that is, query Qi) among a plurality of tokens included in one passage (e.g., $i^{th}$ passage ($p_i^{(aj)}, \ldots, p_i+k^{(aj)}$ of $j^{th}$ article) among K passages (Top K Passage). Here, the span of the answer 3 may be expressed as Equation 5.

$$\text{Answer Span}=\{w_s^{(i)}, w_{s+1}^{(i)}, \ldots, w_{s+e}^{(i)}\}, \quad \text{[Equation 5]}$$

Here, $w_s^{(i)}, w_{s+1}^{(i)}, \ldots, w_{s+e}^{(i)} \in p_M^{(aj)}$.

The neural network model 1000 according to an embodiment of the disclosure may connect m tokens constituting the question 1 and n tokens constituting each of K passages (Top K Passages) ($p_i^{(aj)}, \ldots, p_{i+k}^{(aj)}$) by a new sequence ([CL 5] $p_i^1, p_i^2, \ldots, p_i^{n\ [SEP]\ q}{}_i^1, q_i^2, \ldots, q_i^m$[SEP]). Here, a special classification token (CLS) is a token indicating the start of a sequence, and [SEP] may mean a token for distinguishing between sentences.

According to an embodiment of the disclosure, a neural network model may be applied to CLIPBERT for encoding a sequence and a video. Here, the CLIPBERT is an example of a neural network model, and is not limited thereto. Equation 6 illustrates the arguments input to CLIPBERT, and the output vector h.

$$\text{CLIPBERT}(v, [CLS]p_i^1, p_i^2, \ldots, p_i^n[\text{SEP}]\ q_i^1, q_i^2, q_i^m[\text{SEP}])=[h^{[CLS]}, h^{pi1}, \ldots, h^{qim}, h^{[SEP]}] \quad \text{[Equation 6]}$$

Here, $h^{[CLS]}$ is a vector value obtained by embedding a CLS token, and $h^{(i)}$ is a vector value obtained by embedding an i th token. That is, the neural network model may convert each of the plurality of tokens included in the sequence to a vector value through word embedding.

The neural network model 1000 may identify position information of each of a plurality of tokens based on a vector value corresponding to each of the plurality of tokens.

For example, the neural network model 1000 may identify a first token corresponding to a start position of the answer 3 sentence and a second token corresponding to an end position among the plurality of tokens.

Figure 9:
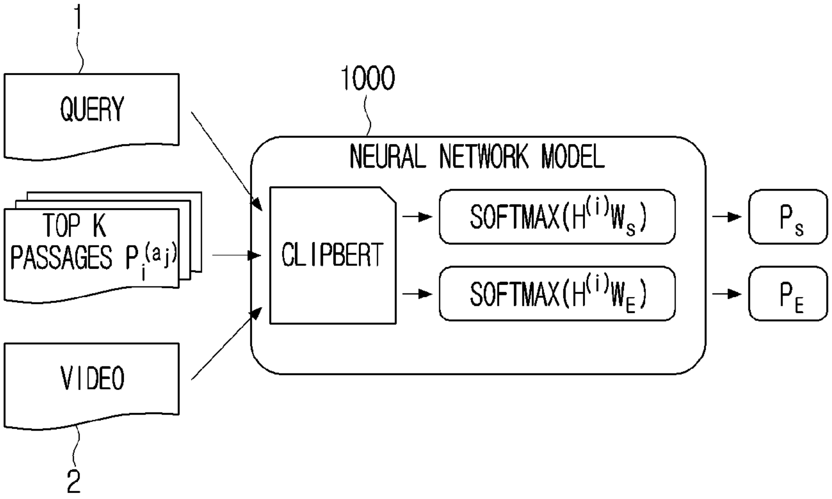
FIG. 9 is a diagram specifically illustrating a neural network model according to an exemplary embodiment of the disclosure.

A specific description will refer to FIG. 9.

FIG. 9 is a diagram specifically illustrating a neural network model according to an embodiment of the disclosure.

According to an embodiment of the disclosure, when an output vector is output from an RNN cell of each time step by inputting each of a plurality of tokens converted to a vector value to each time step for RNN cells included in a language model, the output vector may be converted to a probability value for each token of a sequence through the softmax function. The softmax function estimates a probability that an instance belongs to a particular class. Then, the neural network model may identify a token corresponding to the start point of the sentence of the answer 3 and a token corresponding to the end point based on the size of the probability value.

To be specific, referring to FIG. 9, the neural network model 1000 may input vector values corresponding to each of a plurality of tokens to two separate dense layers.

For example, among the two separate layers, the first layer may be a layer for identifying a first token corresponding to a start position of the answer 3 sentence among a plurality of tokens. The first layer may obtain the first token Ps corresponding to the start position based on Equation 7 as follows.

$$P_s=\text{softmax}(h^{(i)}W_s) \quad \text{[Equation 7]}$$

In addition, the second layer among the two separate layers may be a layer for identifying a second token corresponding to an end position of the answer 3 sentence among the plurality of tokens. The second layer may obtain a second token PE corresponding to the end position based on Equation 8 as follows.

$$P_E=\text{softmax}(h^{(i)}W_E) \quad \text{[Equation 8]}$$

Here, each of $W_s$ and $W_E$ is a learnable parameter, and each of the first layer and the second layer may perform learning to maximize a log-likelihood method of a correct start position and an end position.

In the meantime, the neural network model 1000 may identify an answer span of the first token $P_S$ corresponding to the start positon of the answer 3 sentence and the second token $P_E$ corresponding to the end position based on the maximum value of $P \times P_E$ by identifying $P_S \times P_E$ for all of K passages (Top K passages) ($p_i^{(aj)}$, $p_{i+k}^{(aj)}$) received from the first encoder 10.

Then, the neural network model 1000 may identify a continuous sequence between the first token $P_S$ and the second token $P_E$ from among the N tokens constituting a specific passage (for example, the $i^{th}$ passage ($p_{i(aj)}$) of the $j^{th}$ article) as the answer 3. Here, a sequence refers to continuous data associated with each other, and in the disclosure, a sequence may mean a sentence and a phrase unit, not an individual word.

Returning to FIG. 2, the display apparatus 100 according to an embodiment may include a memory (not shown), and the memory may store data necessary for various embodiments of the disclosure.

The memory may be implemented as a memory type embedded in the display apparatus 100 according to a data storage use, or a memory type detachable from the display apparatus 100.

For example, the data for driving the display apparatus 100 may be stored in a memory embedded in the display apparatus 100, and the data for expansion of the display apparatus 100 may be stored in a memory detachable from the display apparatus 100. A memory embedded in the display apparatus 100 may be a volatile memory such as, for example, and without limitation, a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive, a solid state drive (SSD), or the like. In the case of a memory detachably mounted to the display apparatus 100, the memory may be implemented as, for example, and without limitation, a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

According to an example, the memory may store at least one instruction or a computer program including instructions for controlling the display apparatus 100.

In particular, the memory may store information about a neural network model (or an artificial intelligence model) including a plurality of layers. Here, storing information about the neural network model may mean storing various information related to the operation of the neural network model, for example, information on a plurality of layers included in a neural network model, information on parameters used in each of the plurality of layers (for example, filter coefficients, bias, etc.), and the like.

The display apparatus 100 according to an embodiment of the disclosure may include a communication interface (not shown), and the communication interface may receive various data. For example, the communication interface may receive various data from an external device, an external storage medium (for example, a universal serial bus (USB) memory), an external server (for example, a translation function providing server) through communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

That the neural network model (first encoder 10, second encoder 20, and neural network model 1000 are included) is trained may refer, for example, to a basic neural network model (for example, a neural network model including any random parameter) being trained using a plurality of training data by a learning algorithm, so that a predefined action rule or neural network model set to perform a desired property (or purpose) is made. The learning may be accomplished through a separate server and/or system, but is not limited thereto and may be implemented in the display apparatus 100. Examples of learning algorithms include, but are not limited to, supervised learning, unsupervised learning, semi-supervised learning, or reinforcement learning.

Each of neural network models (including first encoder 10, second encoder 20, and neural network model 1000) may include, but are not limited to, a convolutional neural network (CNN), a recurrent neural network (RNN), a restricted Boltzmann Machine (RBM), a deep belief network (DBN), a bidirectional recurrent deep neural network (BRDNN) or deep Q-Networks, but is not limited thereto.

The processor 120 for executing the neural network model (including first encoder 10, second encoder 20, and neural network model 1000) according to an example embodiment may be implemented through combination with software and a general-purpose processor such as a central processor (CPU), an application processor (AP), a digital signal processor (DSP), a graphics-only processor such as a graphics processor (GPU), a vision processing u (VPU), an AI-only processor such as a neural network processor (NPU), or the like. The processor 120 may perform control to process the input data according to a predefined operating rule or neural network model stored in the memory. If the processor 120 is a dedicated processor (or AI-only processor), it may be designed with a hardware structure specialized for the processing of a particular neural network model. For example, hardware specific to the processing of a particular neural network model may be designed into a hardware chip, such as an application specific integrated circuit (ASIC), a field programmable gate array (FPGA), or the like. In the case of the processor 120 being implemented with a dedicated processor, the processor may be implemented including a memory for implementing an embodiment, or a memory processing function for using an external memory.

According to another example, the memory may store information about a neural network model including a plurality of layers. Here, storing information about the neural network model may mean storing various information related to the operation of the neural network model, for example, information on a plurality of layers included in a neural network model, information on parameters used in each of the plurality of layers (for example, filter coefficients, bias, etc.), and the like.

Figure 10:
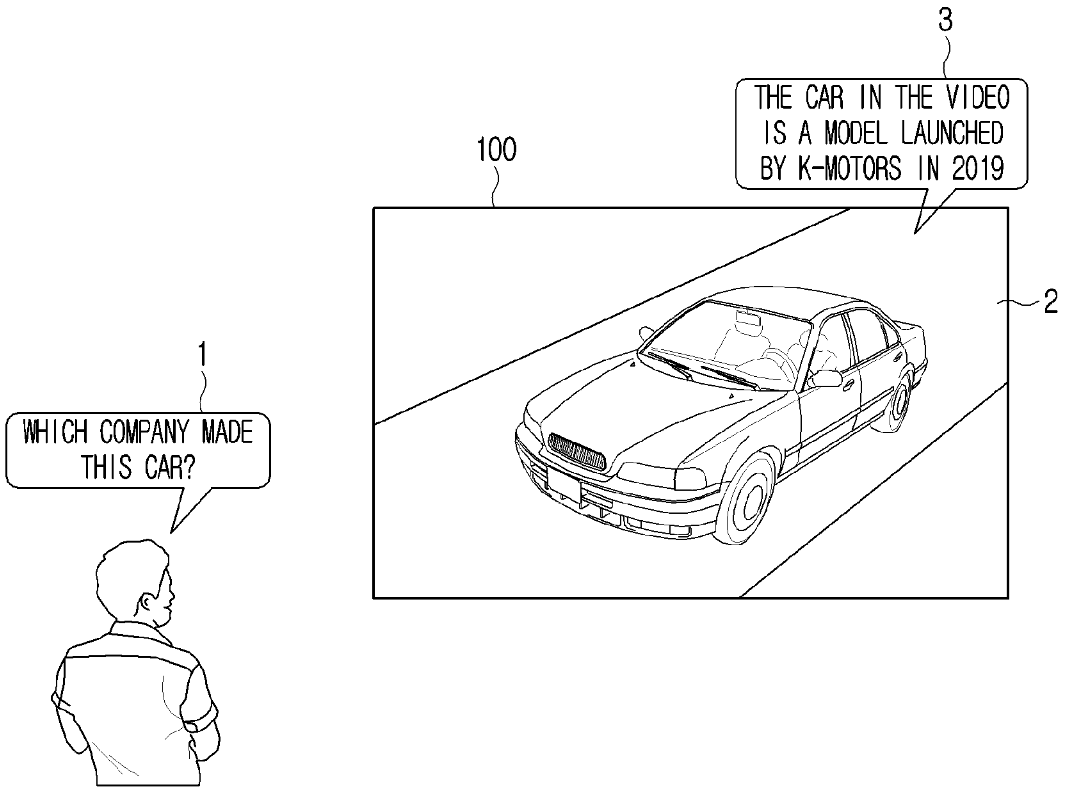
FIG. 10 is a diagram illustrating an operation of a display apparatus in overall according to an exemplary embodiment of the disclosure.

FIG. 10 is a diagram illustrating an operation of a display apparatus in overall according to an embodiment of the disclosure.

Referring to FIG. 10, in step 1, while the display apparatus 100 provides the video 2, the display apparatus 100 may receive the user input 1.

Then, the display apparatus 100 may obtain information on the user input 1. Here, if the user input 1 is an uttered voice of the user (for example, which company made this car?), the display apparatus 100 may perform STT to obtain a text corresponding to the uttered voice of the user as information about the user input 1. In addition to the uttered voice, the user input 1 may include a typed text of a user, gesture of a user, or the like.

The display apparatus 100 may obtain K passages (Top K Passages)($p_i^{(aj)}$, . . . , $p_{i+k}^{(aj)}$) by inputting the information about the user input 1 and the video 2 to the first encoder 10.

Here, each of the K passages (Top K Passages) may be included in any one article like a first article ($a_1$), a second article ($a_2$), . . . , $n^{th}$ article ($a_n$). For example, the first article $a_1$ is an article related to a vehicle emblem, the second article $a_2$ is an article about a list of cars produced by K-Motors, . . . , and $n^{th}$ article ($a_n$) may be an article related to history of a particular model of the K-Motors.

Then, the display apparatus 100 may input the user input 1, the video 2, and K passages (Top K Passages) to the neural network model 1000.

The neural network model 1000 may identify the answer 3 based on the tokens included in each of the video 2, tokens included in the user input 1, and K passages (Top K Passages). Here, the answer 3 may be any one passage or a part of the any one of the K passages (Top K passages). For example, as shown in FIG. 10, the neural network model 1000 may output the answer 3 (the "car in the video is a model launched by K-Motors in 2019").

Figure 11:
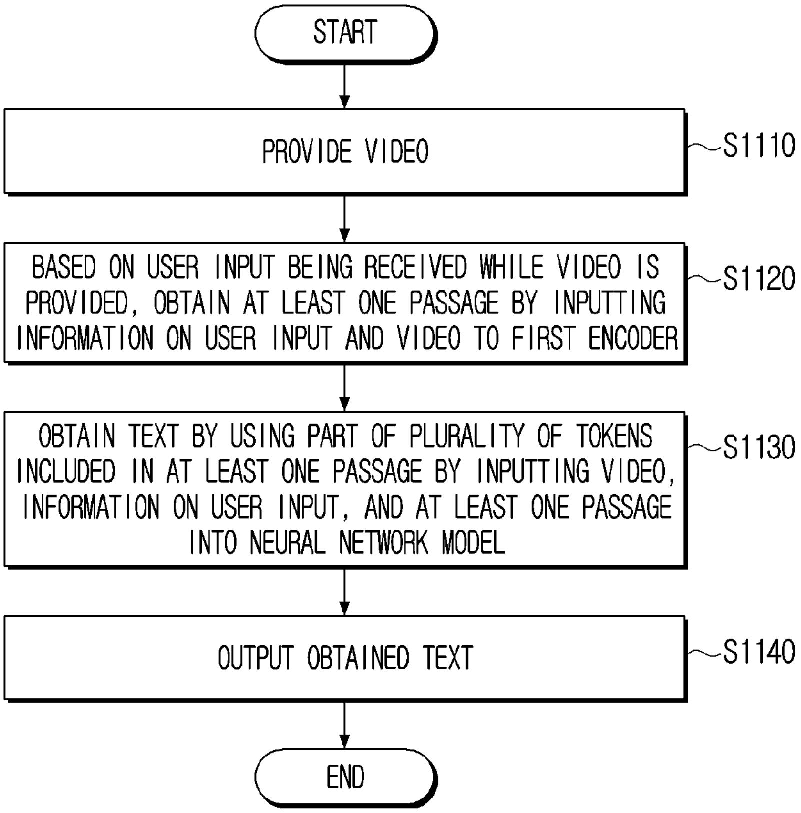
FIG. 11 is a flowchart illustrating a method of controlling a display apparatus according to an exemplary embodiment of the disclosure.

FIG. 11 is a flowchart illustrating a method of controlling a display apparatus according to an embodiment of the disclosure.

A control method of the display apparatus according to an embodiment of the disclosure provides a video first in operation S1110.

Based on a user input being received while a video is provided, at least one passage is obtained by inputting information on the user input and the video to a first encoder in operation S1120.

Then, a text is obtained by using a part of a plurality of tokens included in the at least one passage by inputting the video, the information on the user input, and the at least one passage into a neural network model in operation S1130.

Then, the obtained text is output in operation S1140.

Figure 12:
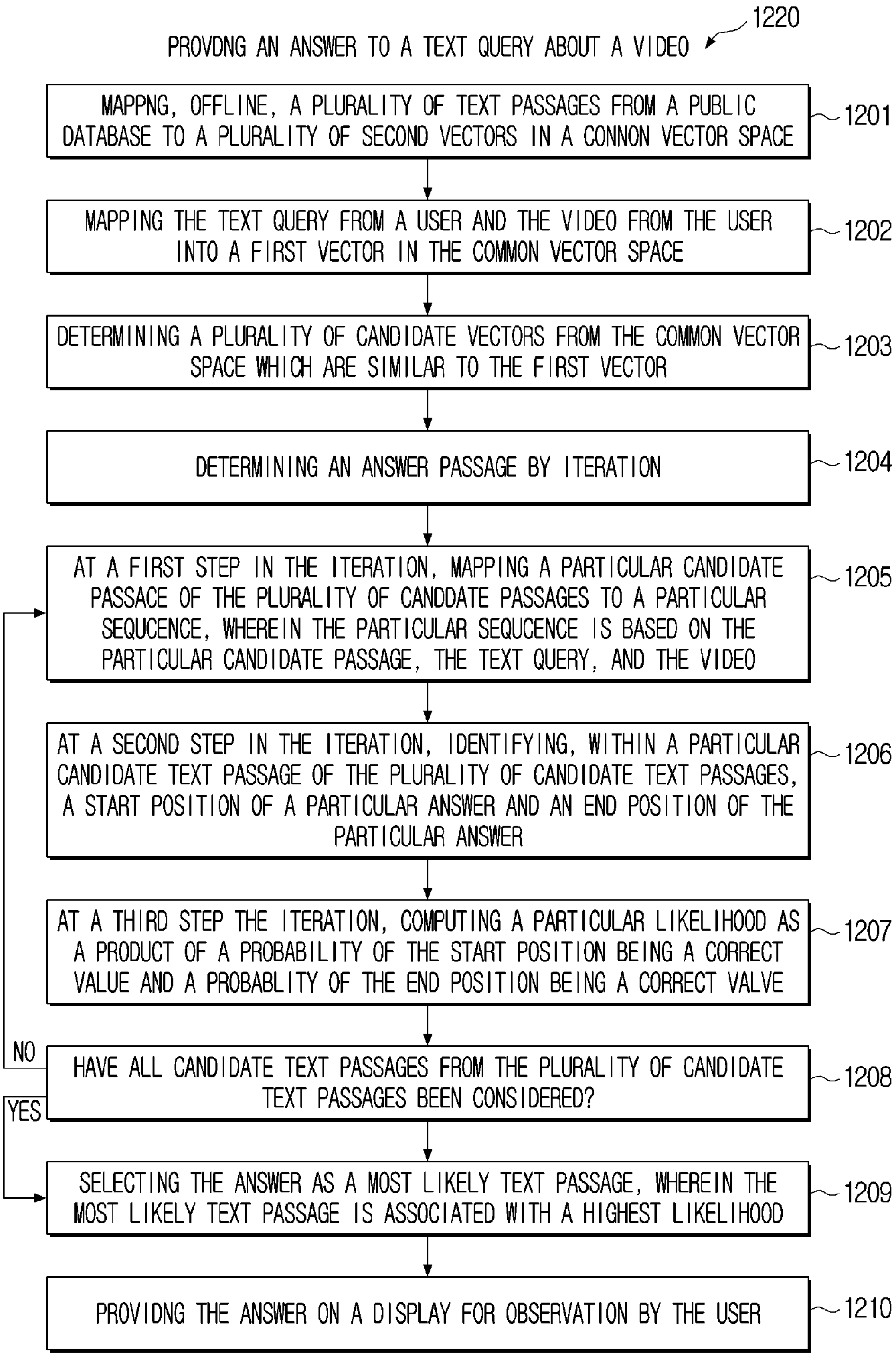
FIG. 12 illustrates a logic flow, according to an exemplary embodiment.

Further to the discussion of embodiments provided above, FIG. 12 illustrates logic 1220 for providing an answer to a query about a video. Logic 1220 includes mapping, offline, a plurality of text passages from a public database to a plurality of second vectors in a common vector space. The plurality of second vectors have been adapted to the common vector space using a second adaptation matrix. See, for example, operation 1201. Logic 1220 also includes mapping the text query from a user and the video from the user into a first vector in the common vector space. The first vector has been adapted to the common vector space using a first adaptation matrix. See, for example, operation 1202. Logic 1220 also includes determining a plurality of candidate vectors from the common vector space which are similar to the first vector. The plurality of candidate text passages respectively correspond to the plurality of candidate vectors. See, for example, operation 1203.

FIG. 12 includes a loop for performing iteration at the second encoder 1000 over the top K passages provided by the retriever (encoder 10 of FIG. 1). The iteration includes determining an answer passage by iteratively mapping, identifying, and computing. See, for example, operation 1204. In an example, the determining the answer passage comprises: at a first step in the iteration, mapping a particular candidate passage of the plurality of candidate passages to a particular sequence. The particular sequence is based on the particular candidate passage, the text query, and the video. See operation 1205. At a second step in the iteration, the iteration includes identifying, within a particular candidate text passage of the plurality of candidate text passages, a start position of a particular answer and an end position of the particular answer. The identifying is based on the particular sequence. See operation 1206. At a third step the iteration includes computing a particular likelihood as a product of a first probability of the start position being a first correct value and a second probability of the end position being a second correct value. See operation 1207. A stopping condition for the iteration occurs when there are no more candidate text passages from the plurality of candidate text passages to be considered. See the stopping condition evaluation at operation 1208. If not all candidates have been considered another iteration is performed by looping back to operation 1205. Otherwise, the iteration is completed and the logic flows to operation 1209.

At operation 1209, the logic 1220 includes selecting the answer as a most likely text passage. The most likely text passage is associated with a highest likelihood resulting from the iteration over the plurality of candidate text passages.

Operation 1210 includes providing the answer on a display for observation by the user. The logic 1220 is completed with operation 1210.

Generally, the first encoder may obtain a first feature vector corresponding to information on the user input and the video under the control of the one or more processors, obtain at least one second feature vector having a similarity equal to or greater than a threshold value with the first feature vector among a plurality of second feature vectors included in a preset dataset, and output the at least one passage corresponding to the at least one second feature vector.

The preset dataset according to an embodiment of the disclosure may include the plurality of second feature vectors corresponding to each of the plurality of articles obtained by inputting the plurality of articles to a second encoder.

The method according to an embodiment of the disclosure may further include obtaining a plurality of passages by separating each of the plurality of articles in a unit of a passage; and obtaining a plurality of second feature vectors by inputting each of the plurality of passages to the second encoder.

The neural network model according to an embodiment of the disclosure may be a model trained to, based on the video, the user input, and the at least one passage being input, obtain the plurality of tokens by tokenizing the user input and the at least one passage, and output the text based on the video and the plurality of tokens. A token may be, for example, a word or a character.

The neural network model may obtain a plurality of vector values by word-embedding each of the plurality of tokens, identify position information of each of the plurality of tokens based on the plurality of vector values, and identify the text by using a portion of the plurality of tokens based on the position information. A wording embedding is a trainable vector that represents a given word.

The neural network model may identify a first token among the plurality of tokens as a start point of the text, and identify a second token among the plurality of tokens as an end point of the text based on the position information, and obtain, as the text, tokens between the first token and the second token from among the plurality of tokens based on the start point and the end point.

The first encoder according to an embodiment of the disclosure may include a neural network model using a video and a text as input data and trained to output a first feature vector by converting the input data into a vector value on a first vector space, and the second encoder may be an encoder using a text as input data and trained to output a second feature vector by converting the input data into a vector value in a second vector space.

Here, each of a first adaptive layer included in the first encoder and a second adaptive layer included in the second encoder may match the first feature vector on the first vector space outputted by the first encoder and the plurality of second feature vectors on the second vector space outputted by the second encoder to a same vector space.

The first encoder according to an embodiment of the disclosure may include a neural network model configured to use a first feature vector corresponding to a video and a text, a first sample passage related to the video and the character, a plurality of second sample passages not related to the video and the text as learning data, and trained to identify at least one second feature vector having a similarity equal to or greater than a threshold value with the first feature vector among the second feature vector corresponding to the first sample passage and a plurality of second feature vectors corresponding to each of the plurality of second sample passages.

The user input may correspond to a question, and the text may correspond to an answer to the question.

The user input according to an embodiment of the disclosure may include at least one of a text corresponding to an uttered voice of the user or a typed text of the user.

However, various embodiments of the disclosure may be applied not only to a display apparatus but also to all electronic devices capable of receiving a user input.

The various example embodiments described above may be implemented in a recordable medium which is readable by computer or a device similar to computer using software, hardware, or the combination of software and hardware. In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations of the electronic apparatus 100 according to the various embodiments described above may be stored in a non-transitory computer-readable medium. The computer instructions stored in this non-transitory computer-readable medium cause the above-described specific device to perform the processing operations of the sound output apparatus 100 according to the above-described various embodiments when executed by the processor of the specific device.

The non-transitory computer readable medium may refer, for example, to a medium that stores data, such as a register, a cache, a memory or etc., and is readable by a device. For example, the aforementioned various applications, instructions, or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. A display apparatus comprising:

a display; and one or more processors configured to:

based on a user input being received while a video is provided through the display, obtain at least one passage by inputting information on the user input and the video to a first encoder, obtain a text by using a part of a plurality of tokens included in the at least one passage by inputting the video, the information on the user input, and the at least one passage into a neural network model, wherein the neural network model is separate from the first encoder, and output the obtained text, wherein obtaining the at least one passage comprises to:

obtain, by the first encoder, a first feature vector corresponding to the information on the user input and the video under the control of the one or more processors, obtain, by the first encoder, at least one second feature vector having a similarity equal to or greater than a threshold value with the first feature vector among a plurality of second feature vectors included in a preset dataset, and output, by the first encoder, the at least one passage corresponding to the at least one second feature vector, wherein the preset dataset comprises the plurality of second feature vectors corresponding to each of a plurality of articles obtained by inputting the plurality of articles to a second encoder.

2. The display apparatus of claim 1, wherein the one or more processors are further configured to:

obtain a plurality of passages by separating each of the plurality of articles in a unit of a passage, the plurality of passages comprising the at least one passage, and obtain the plurality of second feature vectors by inputting each of the plurality of passages to the second encoder.

3. The display apparatus of claim 1, wherein the neural network model is a model trained to, based on the video, the user input, and the at least one passage being input, obtain the plurality of tokens by tokenizing the user input and the at least one passage, and output the text based on the video and the plurality of tokens.

4. The display apparatus of claim 3, wherein the neural network model is further configured to:

obtain a plurality of vector values by word-embedding each of the plurality of tokens, identify position information of each of the plurality of tokens based on the plurality of vector values, and identify the text by using a portion of the plurality of tokens based on the position information.

5. The display apparatus of claim 4, wherein the neural network model is further configured to:

identify a first token among the plurality of tokens as a start point of the text, and identify a second token among the plurality of tokens as an end point of the text based on the position information, and obtain, as the text, tokens between the first token and the second token from among the plurality of tokens based on the start point and the end point.

6. The display apparatus of claim 1, wherein the first encoder comprises a neural network model using the video and the text as input data and trained to output the first feature vector by converting the input data into a vector value on a first vector space, wherein the second encoder is an encoder using the text as input data and trained to output the at least one second feature vector by converting the input data into a vector value in a second vector space.

7. The display apparatus of claim 6, wherein each of a first adaptive layer included in the first encoder and a second adaptive layer included in the second encoder matches the first feature vector on the first vector space outputted by the first encoder and the plurality of second feature vectors on the second vector space outputted by the second encoder to a same vector space.

8. The display apparatus of claim 1, wherein the first encoder comprises a neural network model configured to:

use the first feature vector corresponding to the video and the text, a first sample passage related to the video and a character, a plurality of second sample passages not related to the video and the text as learning data, and trained to identify the at least one second feature vector having a similarity equal to or greater than a threshold value with the first feature vector among the second feature vector corresponding to the first sample passage and the plurality of second feature vectors corresponding to each of the plurality of second sample passages.

9. The display apparatus of claim 8, wherein the user input corresponds to a question, and wherein the text corresponds to an answer to the question.

10. The display apparatus of claim 1, wherein the user input comprises at least one of a text corresponding to an uttered voice of a user or a typed text of the user.

11. A method of controlling a display apparatus, the method comprising:

providing a video;

based on a user input being received while a video is provided, obtaining at least one passage by inputting information on the user input and the video to a first encoder;

obtaining a text by using a part of a plurality of tokens included in the at least one passage by inputting the video, the information on the user input, and the at least one passage into a neural network model, wherein the neural network model is separate from the first encoder; and outputting the obtained text, wherein obtaining the at least one passage comprises to:

obtain, by the first encoder, a first feature vector corresponding to the information on the user input and the video under the control of the one or more processors, obtain, by the first encoder, at least one second feature vector having a similarity equal to or greater than a threshold value with the first feature vector among a plurality of second feature vectors included in a preset dataset, and output, by the first encoder, the at least one passage corresponding to the at least one second feature vector, wherein the preset dataset comprises the plurality of second feature vectors corresponding to each of a plurality of articles obtained by inputting the plurality of articles to a second encoder.

12. The method of claim 11, further comprising:

obtaining a plurality of passages by separating each of the plurality of articles in a unit of a passage, the plurality of passages comprising the at least one passage, and obtaining the plurality of second feature vectors by inputting each of the plurality of passages to the second encoder.

13. The method of claim 11, wherein the neural network model is a model trained to, based on the video, the user input, and the at least one passage being input, obtain the plurality of tokens by tokenizing the user input and the at least one passage, and output the text based on the video and the plurality of tokens.

14. The method of claim 13, wherein the neural network model is further configured to:

obtain a plurality of vector values by word-embedding each of the plurality of tokens, identify position information of each of the plurality of tokens based on the plurality of vector values, and identify the text by using a portion of the plurality of tokens based on the position information.

15. The method of claim 14, wherein the neural network model is further configured to:

identify a first token among the plurality of tokens as a start point of the text, and identify a second token among the plurality of tokens as an end point of the text based on the position information, and obtain, as the text, tokens between the first token and the second token from among the plurality of tokens based on the start point and the end point.

16. The display apparatus of claim 1, wherein an uttered voice of a is detected by the display device as the user input, the video is captured by a camera of the display device.

17. The display apparatus of claim 16, wherein a speech to text algorithm is used to convert the uttered voice to the text.

18. The method of claim 11, further comprising:

detecting by the display apparatus an uttered voice of the user as a user input; and capturing the video by a camera of the display apparatus.

19. The method of claim 18, further comprising converting, by the display apparatus using a speech to text algorithm, the uttered voice to the first text.

20. A method of providing an answer to a text query about a video, the method comprising:

mapping, offline, a plurality of text passages from a public database to a plurality of second vectors in a common vector space, wherein the plurality of second vectors have been adapted to the common vector space using a second adaptation matrix;

mapping the text query from a user and the video from the user into a first vector in the common vector space, wherein the first vector has been adapted to the common vector space using a first adaptation matrix;

determining a plurality of candidate vectors from the common vector space which are similar to the first vector, wherein a plurality of candidate text passages respectively correspond to the plurality of candidate vectors;

determining an answer passage based on the plurality of candidate text passages by interactions of mapping, identifying, and computing, wherein the determining the answer passage comprises:

at a first step in each iteration, mapping a particular candidate passage of the plurality of candidate text passages to a particular sequence, wherein the particular sequence is based on the particular candidate passage, the text query, and the video, at a second step in each iteration, identifying, within a particular candidate text passage of the plurality of candidate text passages, a start position of a particular answer and an end position of the particular answer, wherein the identifying is based on the particular sequence, at a third step in each iteration, computing a particular likelihood as a product of a first probability of the start position being a first correct value and a second probability of the end position being a second correct value, and stopping the iteration when there are no more candidate text passages from the plurality of candidate text passages to be considered;

selecting the answer as a most likely text passage, wherein the most likely text passage is associated with a highest likelihood resulting from the iterations over the plurality of candidate text passages; and providing the answer on a display for observation by the user.

* * * * *